United States Patent [19]
Lee et al.

[11] Patent Number: 5,842,820
[45] Date of Patent: Dec. 1, 1998

[54] CUTTER FOR USE IN FORMING DOWELS, PLUGS, AND TENONS

[75] Inventors: Leonard G. Lee, Ottawa; Robin C. Lee, Nepean, both of Canada

[73] Assignee: Lee Valley Tools Ltd., Ottawa, Canada

[21] Appl. No.: 787,645

[22] Filed: Jan. 23, 1997

[51] Int. Cl.$^6$ .................................................. B23B 51/04
[52] U.S. Cl. ............................................ 408/204; 408/206
[58] Field of Search ........................... 144/23; 408/203.5, 408/204, 205, 206, 207, 209, 703

[56] References Cited

U.S. PATENT DOCUMENTS

| | | |
|---|---|---|
| 117,786 | 8/1871 | Kniffen . |
| 473,231 | 4/1892 | Leffel . |
| 475,560 | 5/1892 | Heydenreich . |
| 476,312 | 6/1892 | Resche . |
| 1,494,897 | 5/1924 | Freye . |
| 2,027,139 | 1/1936 | Abramson et al. . |
| 2,062,257 | 11/1936 | Douglas et al. ......................... 408/204 |
| 2,748,817 | 6/1956 | Stearns . |
| 2,978,002 | 4/1961 | Ransom . |
| 3,130,763 | 4/1964 | Schlosser et al. . |
| 3,973,862 | 8/1976 | Segal ....................... 408/226 |
| 4,295,763 | 10/1981 | Cunniff . |
| 4,452,554 | 6/1984 | Hougen . |
| 4,573,838 | 3/1986 | Omi et al. . |
| 4,595,321 | 6/1986 | Van Dalen . |
| 4,758,120 | 7/1988 | Bijl ......................... 408/204 |
| 4,767,244 | 8/1988 | Peterson . |
| 4,767,245 | 8/1988 | Shoji et al. ............... 408/204 |
| 5,104,125 | 4/1992 | Sevack et al. . |
| 5,213,456 | 5/1993 | Lee . |

FOREIGN PATENT DOCUMENTS

| | | |
|---|---|---|
| 313237 | 4/1989 | European Pat. Off. ............... 408/204 |
| 1040092 | 10/1953 | France . |
| 2535635 | 5/1984 | France . |
| 293770 | 3/1915 | Germany . |
| 96710 | 6/1982 | Japan . |
| 154709 | 6/1993 | Japan ..................... 408/204 |
| 1159724 | 6/1985 | Russian Federation . |
| 1766653 | 10/1992 | Russian Federation . |
| 81021 | 7/1934 | Sweden . |
| 369980 | 4/1973 | U.S.S.R. ............................... 408/206 |
| 3726 | of 1869 | United Kingdom . |
| 557335 | 11/1943 | United Kingdom ................... 408/206 |

OTHER PUBLICATIONS

Tool and Manufacturing Engineers Handbook, Fourth Edition, vol. 1, Machining, Society of Manufacturing Engineers, 1983, chapter 9, pp. 14–15.
*Trend Routing Technoloy* Catalog, p. 43, (undated).
Catalog *Woodworkers Supply, Inc.* (Aug., 1993).

*Primary Examiner*—Daniel W. Howell
*Attorney, Agent, or Firm*—Kilpatrick Stockton LLP; John S. Pratt

[57] ABSTRACT

A cutter for use in fabricating dowels, plugs, or tenons has a hex-shaped shank and a body portion. The body portion includes a spur which is the first part of the cutter to contact the wood and which makes an initial depression into the wood. A cutting tooth has a cutting edge for cutting a trough into the wood and is the widest part of the cutter. The exterior surfaces of the cutter above the cutting tooth are formed at smaller radial distances and consequently have less, if not no, contact with the piece of wood being cut. The cutting tooth may be tapered along its height whereby the bottom of the tooth would be the thickest part of the tooth and would have the most contact with the wood. Also, the portion of the cutter trailing the spur may be formed with teeth and flutes thereby reducing the amount of contact between the cutter and the wood. By reducing the amount of contact between the wood and the cutter, the cutter has a reduced amount of friction with the wood. Since a significant concern with conventional cutters is the build-up of heat, by reducing friction the cutters can also reduce the amount of heat generated and reduce any chance that the wood or the cutter becomes burned or otherwise damaged by the heat. Furthermore, the cutters are more efficient to operate since they require less torque and consume less electricity.

33 Claims, 3 Drawing Sheets

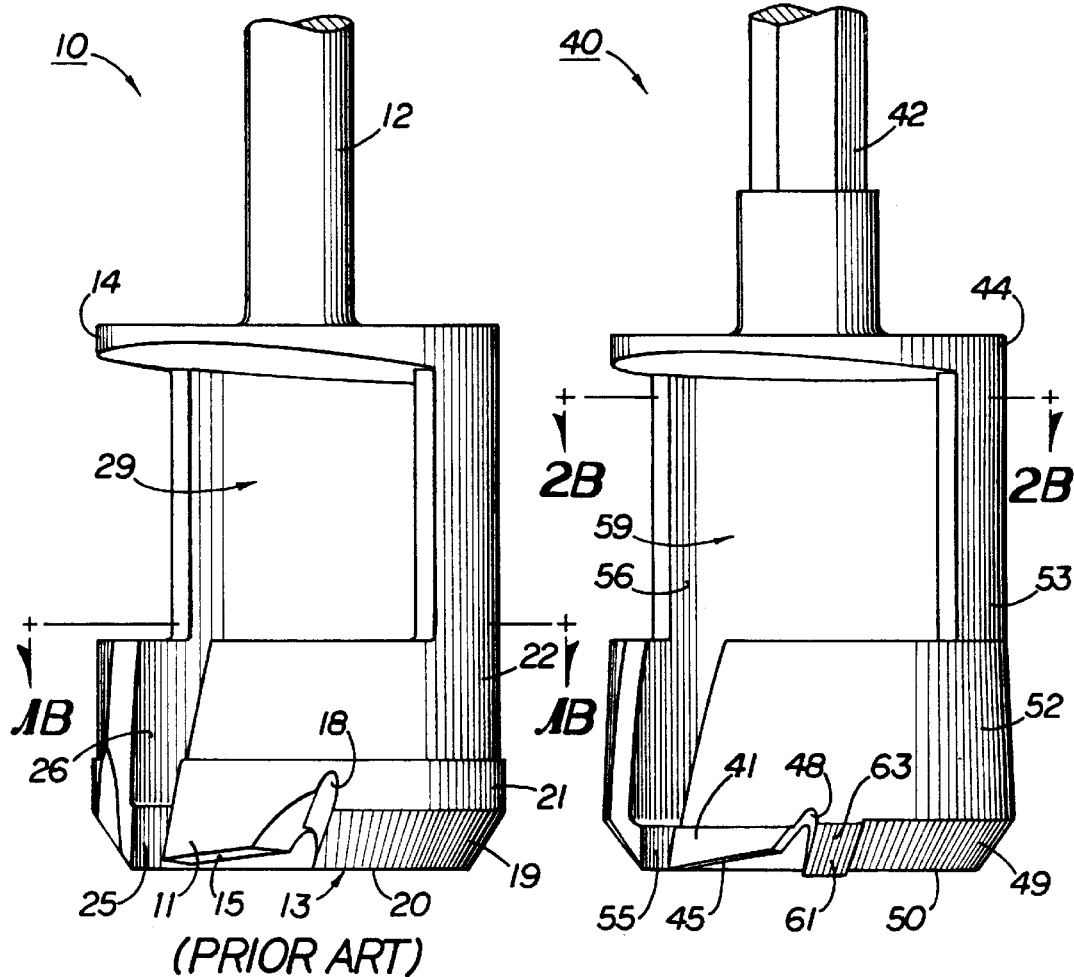
FIG 1A (PRIOR ART)    FIG 2A
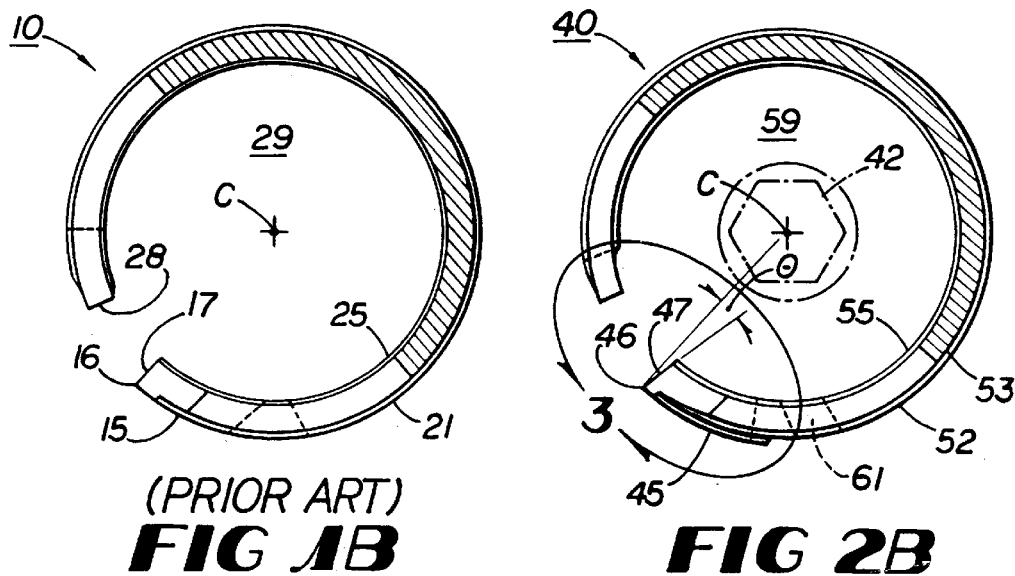
FIG 1B (PRIOR ART)    FIG 2B

CUTTER FOR USE IN FORMING DOWELS, PLUGS, AND TENONS

FIELD OF THE INVENTION

This invention relates to a cutter for use in making wooden dowels, plugs, or tenons and, more particularly, to a cutter which more accurately makes dowels, plugs, or tenons while requiring less power and while generating a smaller amount of heat during its operation.

BACKGROUND OF THE INVENTION

A conventional cutter 10 for making wooden dowels, plugs, or tenons is shown in FIGS. 1A and 1B and comprises a shank 12 to be received within a drill press chuck and a body portion 14. The body portion 14 includes a cutting tooth 15 having a leading arris 16 which contacts and cuts the wood as the cutter 10 is rotated and lowered into the wood by the drill press. The cutting tooth 15 is also defined by an interior surface 25 and by an exterior surface 11. The body portion 14 of the cutter 10 further includes a beveled surface 19 on an exterior of the cutter 10 and a ridge 20 formed at a juncture of the beveled surface 19 with the interior surface 25 of the cutter 10. A flute 18 is defined between the cutting tooth 15 and the beveled surface 19 of the cutter 10.

In operation, the cutter 10 is secured within the chuck of a drill press and is rotated at a relatively high speed (the appropriate speed depends on the diameter of cutter 10). As the cutter 10 is being lowered by the drill press, the ridge 20 forms a circular depression in a piece of wood and is the first part of the cutter 10 that contacts the wood. After the depression is formed by the ridge 20 and the cutter 10 is lowered an additional distance, the leading arris 16 of the cutting tooth 15 next contacts the wood and cuts a circular trough within the wood. As the cutter 10 continues to be lowered by the drill press, the ridge 20 and the cutting tooth 15 form a deeper trough in the wood, and a cylindrical wood member is received within a bore 29 of the cutter 10. The initial depression formed by the ridge 20 receives the interior surface 25 of the cutting tooth 15 thereby guiding and stabilizing the cutter 10 as it is lowered into the wood. The circular trough cut by the cutter 10 has an outer diameter defined by the exterior surface 11 of cutting tooth 15 and an inner diameter defined by the interior surface 25. The wood member received within the central bore 29 may be used as a dowel, tenon, or plug in ways apparent to those skilled in the art.

A problem with prior art cutter 10 is that a relatively large amount of frictional force is present between the cutter 10 and the wood. During operation, the ridge 20 of the cutter 10 is in continuous contact with the wood as the cutter 10 is being lowered into the wood. Also, in addition to the ridge 20, both the interior surface 25 and exterior surfaces 11 of cutting tooth 15 are in continuous contact with the wood since these surfaces 25 and 11 are respectively at the smallest and largest radial distances from a center C of the cutter 10. The inner surface 25 of the cutter 10 and an outer surface 21 formed above the beveled surface 19 are also formed at the smallest and largest radial distances of the cutter 10, respectively, so that both of these surfaces 25 and 21 are in continuous contact with the wood. Thus, in all, the ridge 20 and each of the surfaces 11, 21, and 25 are always in frictional engagement with the wood.

The other surfaces of the body portion 14 also come in contact with the wood during operation of the cutter 10 but to a lesser degree than the ridge 20 and surfaces 11, 21, and 25. These other surfaces of the cutter 10 include a second exterior surface 22 and a second interior surface 26 which are recessed relative to the outer surface 21 and the inner surface 25, respectively. Since the surfaces 22 and 26 are recessed relative to surfaces 21 and 25, respectively, the surfaces 22 and 26 are spaced farther away from the wood than surfaces 21 and 25 and thus have less contact with the wood. Even though these surfaces 22 and 26 are spaced apart from the wood, the surfaces 22 and 26 may nonetheless still contact the wood due to such factors as rotation of the cutter 10 at a slight angle offset from the vertical axis.

Each of the surfaces that are in frictional engagement with the wood generate heat when cutter 10 rotates. Thus, during the rotation of the cutter 10, heat will be generated at the ridge 20 and along surfaces 11, 21, and 25. At times, sufficient heat will be generated to burn the surface of the wood and harmfully heat the cutter 10. The generation of harmful heat is especially problematic with hardwoods.

Friction between the wood and the ridge 20 and surfaces 11, 21 and 25 also decreases the efficiency of the cutting operation. In order to cut the wood, the drill press must provide a rotational force greater than the frictional forces before the cutter 10 will even begin to rotate. The rotational force exerted simply to overcome the frictional forces increases the amount of torque that the drill press must be capable of providing.

SUMMARY OF THE INVENTION

The present invention solves the problems of the prior art by providing a cutter that has substantially reduced contact with the wood. By reducing the amount of contact with the wood, and consequently the amount of friction, operation of the cutter is less likely to generate heat which may burn or otherwise damage the wood or cutter. The reduced contact with the wood also permits a drill press to form a dowel, plug, or tenon more easily.

The cutter according to the invention reduces the amount of contact with the wood in several ways. The cutter has a spur which depends from the bottom of the cutter and which is the first part of the cutter to contact the wood. The spur forms a circular depression in the wood and this depression defines the diameter of the plug, dowel, or tenon formed by the cutter. An adjacent cutting tooth follows the depression formed by the spur and subsequently cuts a trough in the wood. A bottom ridge of the cutter, which is higher than the spur, does not contact the bottom of the trough, thereby reducing the amount of contact between the cutter and the wood. The exterior surface of the cutting tooth is formed at a distance farther away from the center of the cutter than any other part of the cutter and may be angled along its height to minimize contact with the workpiece. An exterior surface of the cutter formed directly above the cutting tooth is recessed relative to the cutting tooth and also may be angled to further reduce the amount of contact between the cutter and the wood. A second exterior surface formed above the tapered exterior surface is recessed relative to the tapered surface to reduce even further the amount of contact between the wood and the cutter. Each of these reductions in contact contributes to a substantial overall reduction in contact and a substantial reduction in friction and consequent reduction in heat generation.

It is thus an object of the present invention to provide a cutter that can be used to make a dowel, plug, or tenon, which has reduced contact with the wood being machined.

It is a another object of the present invention to provide a cutter that has reduced friction with the wood being machined.

It is yet a further object of the present invention to provide a cutter that can be used to more efficiently fabricate a dowel, plug, or tenon by reducing power consumption.

It is an additional object of the present invention to provide a cutter that can be used to fabricate a dowel, plug, or tenon while generating reduced levels of heat.

Other objects, features, and advantages will become apparent with reference to the remainder of this document.

BRIEF DESCRIPTION OF THE DRAWINGS

The accompanying drawings, which are incorporated in and form a part of the specification, illustrate embodiments of the present invention and, together with the description, serve to explain the principles of the invention. In the drawings:

FIGS. 1A and 1B are front and partial top views of a conventional cutter;

FIGS. 2A and 2B are front and partial top views of a cutter according to a first embodiment of the invention;

DETAILED DESCRIPTION

Figure 3:
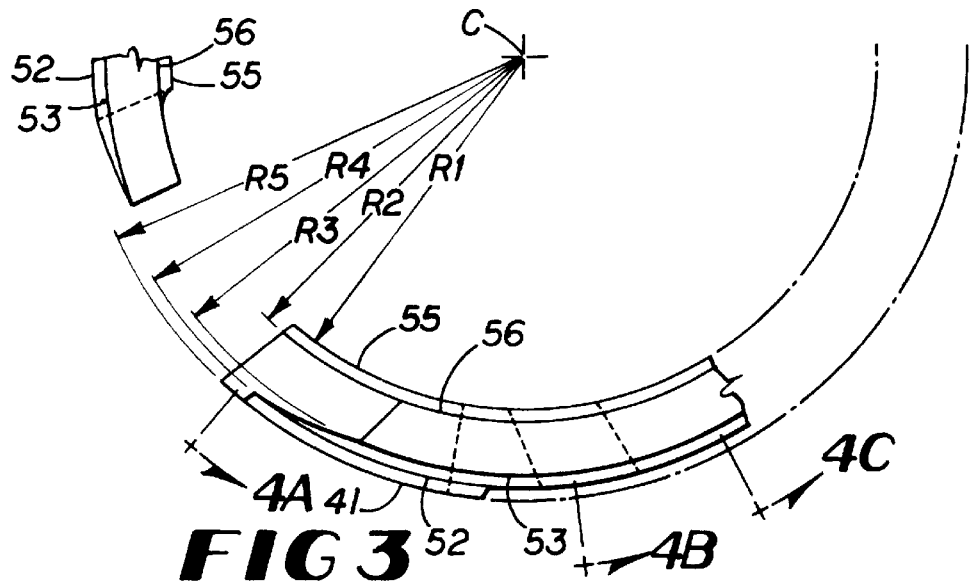
FIG. 3 is a diagram of a top sectional view of the cutter depicting radial dimensions for various surfaces on the cutter of FIGS. 2A and 2B.

With reference to FIGS. 2A and 2B, a cutter 40 according to a first embodiment of the invention comprises a shank 42 and a body portion 44. The shank 42, in contrast to the shank 12 of the conventional cutter 10 having a circular cross-section, has a hex-shaped cross-section. This hex-shaped shank 42 permits three jaws of a chuck in a typical drill press to engage the cutter 40 more firmly. The hex-shaped shank 42 aides in improving the overall performance of the cutter 40 by preventing the cutter 40 from slipping or rotating within the chuck of the drill press.

The body portion 44 of the cutter 40 comprises a cutting tooth 45 having a leading arris 46 for cutting into a surface of wood and for forming a circular trough as the cutter 40 is rotated by the drill press. In addition to the arris 46, the cutting tooth 45 is also defined by a cutting tooth 47, an interior surface 55, and an exterior surface 41. In contrast to a cutting tooth 17 of the prior art cutter 10, the cutting tooth 47 of the cutter 40 is not formed along a radius of the cutter 40 but rather is angled inwardly. By forming the cutting tooth 47 at an inward angle of θ, the arris 46 is formed at a sharper angle whereby "shavings" of wood are more easily removed from the workpiece.

The cutter 40 also has a spur 61 which is separated from the cutting tooth 45 by a flute 48. The spur 61 is proud relative to the tooth 15 and to a beveled surface 49 with the result that the spur 61 is the first part of the cutter 40 that comes in contact with the wood. The spur 61 is also proud relative to the beveled surface 49 since its outer face 63 is formed at a larger radial distance from the center C of the cutter 40 than the beveled surface 49. A ridge 50, formed along the bottom of the cutter 40, is defined by the juncture of the beveled surface 49 with the interior surface 55.

Figure 4A:
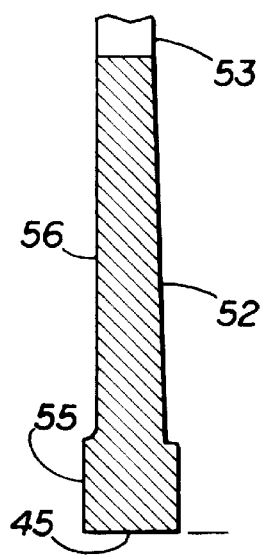
FIGS. 4A, 4B and 4C are sectional side views along a cutting tooth, spur, and beveled areas of the cutter in FIGS. 2A and 2B.
Figure 4B:
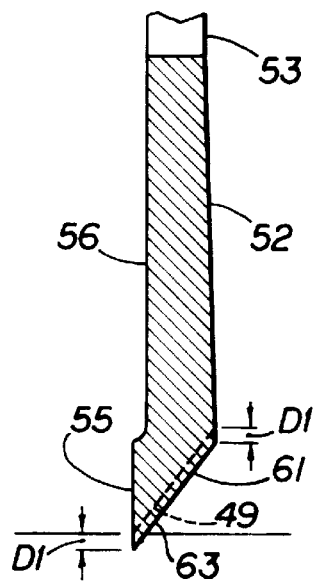
Figure 4C:
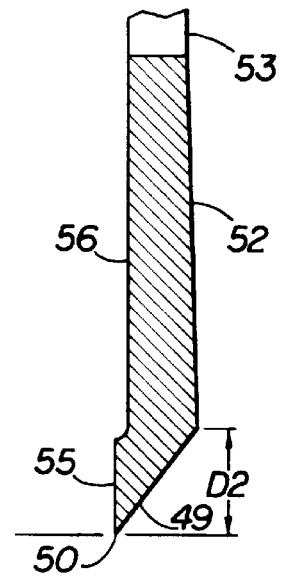

As best seen in FIGS. 4A to C, the cutting tooth 45 is the thickest part of the cutter 40 and extends from the interior surface 55 having a radial distance of R1 to the exterior surface 41 having a radial distance of R5. The interior surface 55 is also formed at the radial distance of R1, but a second interior surface 56, formed directly above the surface 55, is recessed relative to the surface 56 and is formed at a radial distance of R2. An exterior surface 52 of the cutter 40, formed directly above the surface 41 of the cutting tooth 45, is recessed relative to the exterior surface 41 and is formed at a radial distance of R4. A second exterior surface 53 formed at a radial distance of R3 is recessed relative to both exterior surfaces 41 and 52.

During operation of the cutter 40, the interior surface 55 is the only interior surface that is in primary contact with the wood. The other interior surface 56 is formed at a larger radial distance of R2 and has little or no contact with the wood. The exterior surface 41 of the cutting tooth 45 is in continuous contact with the wood, and the surfaces 52 and 53, which are formed at the smaller radial distances of R4 and R3, respectively, have less contact if any.

In comparison to the conventional cutter 10, the cutter 40 has a dramatically smaller total amount of surface area in contact with the wood. Whereas the conventional cutter 10 has an exterior surface 21 formed at the same radial distance as the cutting tooth 15, exterior surface 41 of the cutting tooth 45 is the only exterior surface formed at the largest radial distance of R5. Cutter 40 therefore has reduced the amount of surface area in contact with the wood by at least the surface area of the conventional cutter's surface 21. The cutting tooth 45 of cutter 40 also has a substantially reduced height relative to the cutting tooth 15 of the conventional cutter 10. This reduced height also reduces the amount of surface area that comes in contact with the wood on both the interior surface 55 and exterior surface 41 of cutter 40. Furthermore, conventional cutter 10 only has one exterior surface 22 recessed relative to surface 11 of the cutting tooth 15. Cutter 40, on the other hand, has the surface 52 recessed relative to the exterior surface 41 of the cutting tooth 45 and, moreover, has surface 53 recessed relative to both surfaces 41 and 52. By forming surface 53 at the even smaller radial distance of R3, cutter 40 further decreases the extent of any contact between the wood and the cutter's exterior surface. The amount of contact between the wood and the cutter 40 is even further reduced since the surface 52 is a portion of a cone rather than a cylinder, so that the upper portion of the surface 52 is formed at a smaller radial distance from the rotational axis C than the lower portion of the surface 52.

The cutter 40 also has less surface area in contact with the wood since the ridge 50 is in less contact with the wood than the ridge 20 of the conventional cutter 10. With reference to FIGS. 4A and 4C, which illustrate cross-sectional views of the cutter 40 along the cutting tooth 45 and beveled surface 49, respectively, cutting tooth 45 and ridge 50 terminate in the same plane normal to the rotational axis of cutter 40. In contrast, spur 61, as shown in FIG. 4B, extends a small distance D1 below the cutting tooth 45 and ridge 50. As a result, in comparison to the beveled surface 19 and ridge 20 in the conventional cutter 10, the beveled surface 49 and the ridge 50 have substantially less contact with the wood.

Figure 5:
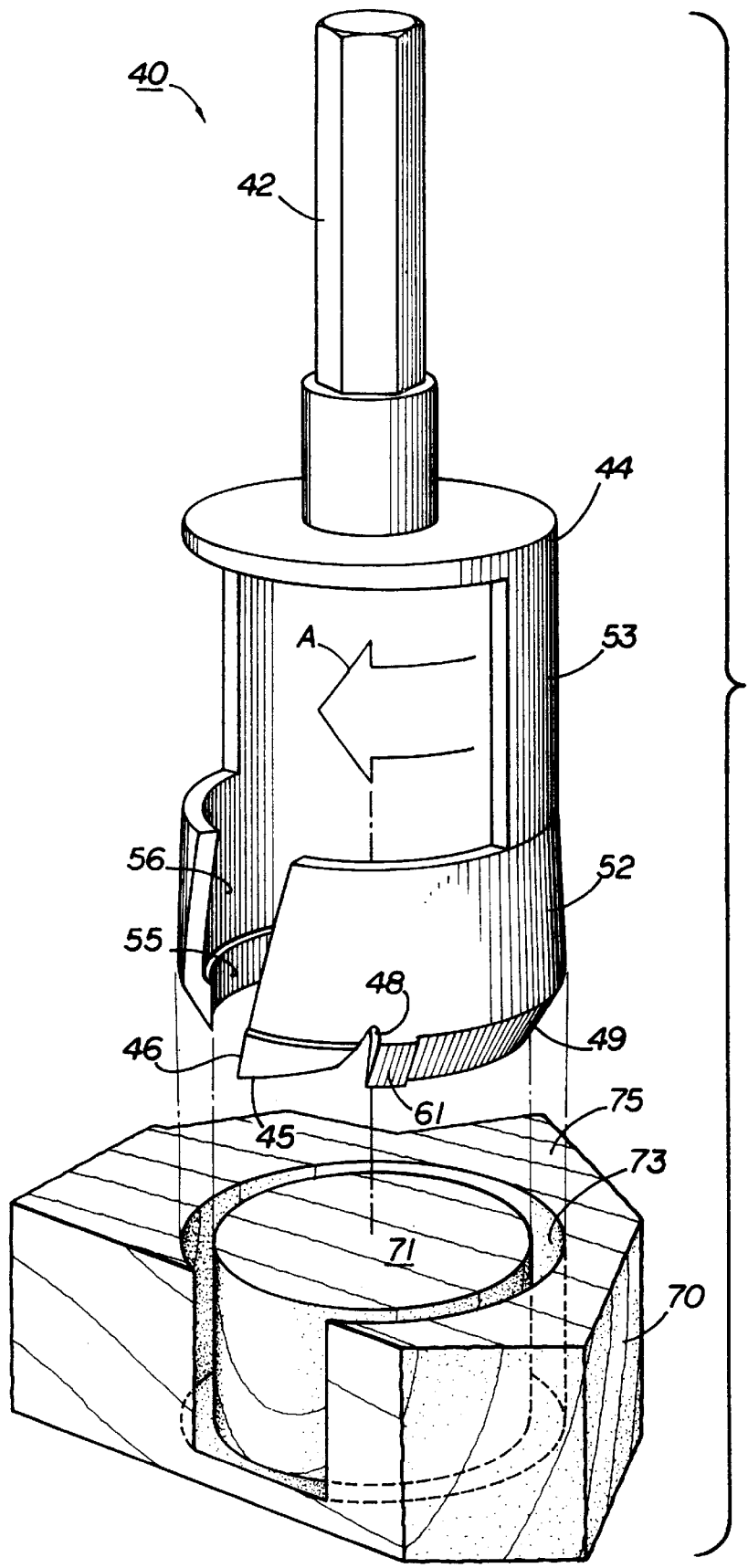
FIG. 5 is a perspective view of the cutter of FIGS. 2A and 2B in operation depicting a direction of rotation and a piece of wood that has been cut by the cutter.

Operation of cutter 40 may be appreciated by reference to FIG. 5. Although a drill press or other such device is used for rotating the cutter 40, the drill press has been omitted from FIG. 5 in order to simplify illustration of the invention. The cutter 40 is rotated in the direction of arrow A and is lowered onto an upper surface 75 of a piece of wood 70. As the cutter 40 is being lowered, the spur 61 is the first part of the cutter 40 that comes in contact with the wood 70, and it scores a circular depression in the wood 70. Next, after the cutter 40 is lowered the distance D1, the interior surface 55 of the cutter 40 travels within the depression, thereby stabilizing rotation of the cutter 40. The distance D1 is preferably very small, such as only 0.25 millimeters, so that the cutting tooth 45 and surface 55 quickly enter the preliminary rim or depression and quickly come in contact with the wood 70. If the distance D1 is too large, the cutter 40 could become unstable due to unbalanced contact between the wood and the spur 61.

Once the cutting tooth 45 comes in contact with the wood 70, a trough 73 is cut in the wood 70 by the leading arris 46 of the cutter 40. The cutting tooth 47 is formed at the angle θ and is also formed at angle along the length of the cutter 40 so that removed particles of wood are guided upwards away from the bottom of the trough 73. The surface 41 of the cutting tooth 45, as discussed above, is the only part of the cutter 40 formed at the largest radial distance R5 so that most, if not all, of the contact between the exterior of the cutter 40 and the wood 70 occurs at surface 41. As the cutter 40 is lowered and the depth of the trough 73 increases, the exterior surfaces 52 and 53 have less, if any, contact with the wood 70 in comparison to surface 41. The interior surface 56 is also in less, if any, contact with the wood 70 in comparison to the interior surface 55.

Flute 48 in the cutter 40 is angled so that removed wood chips are guided away from the bottom of the trough 73. In contrast to flute 18 in cutter 10, flute 48 in cutter 40 extends above the height of the cutting tooth 45 within surface 52. Since the surface 52 is formed at the radial distance R4, which is less than the radial distance of R5 for the surface 41, wood removed by the spur 61 can easily travel up away through the flute 48 and be contained between the space defined between the surface 52 and the piece of wood 70. The flute 18 in the conventional cutter 10, in contrast, forces wood removed by the ridge 20 between the surface having the largest radial distance, namely surface 21, and the wood. By guiding the removed particles of wood into a space between the cutter 40 and the wood 70, the cutter 40 experiences a reduced amount of friction with the wood 70.

As the cutter 40 is lowered into the wood 70, the cutter 40 forms a progressively deeper trough 73 in the wood 70. By cutting the trough 73, the cutter 40 defines an inner cylindrically-shaped wood member 71 that can be used as a dowel, plug, or tenon. The diameter of plug 71 is dictated by the radial distance R1 for the interior surface 55, which, among many other alternatives, may be, for instance 0.75 inches, forming a plug 71 1.5 inches in diameter. The maximum height of plug 71 is dictated by the length of the bore 59, which may be, for instance, 2.25 inches in a 1.5 inch diameter cutter 40.

In a cutter 40 dimensioned to cut a plug, dowel, or tenon 1.5 inches in diameter, the radial distances R1 to R5 shown in FIG. 3 are preferably R1=0.75 inches, R2=0.7875 inches, R3=0.8770 inches, R4=0.8840 inches, and R5=0.9025 inches. The surface 52 is angled to have an outer diameter of 1.768 inches near surface 53 and an outer diameter of 1.800 inches near beveled surface 49 and surface 41. A height D2 of the beveled surface 49, as shown in FIG. 4C, is approximately equal to 0.25 inches and the distance D1, defined as the difference in length between the spur 61 and the cutting tooth 45, is approximately equal to only 0.25 millimeters. As will be apparent to those skilled in the art, however, the dimensions of the cutter 40 are not limited to these exact values but can be varied according to the type of wood being used and the length and diameter of plug, dowel, or tenon desired.

As discussed above, the cutter 40 has a substantially reduced amount of contact with the wood relative to the conventional cutter 10. In summary, this reduced amount of contact is due to numerous differences in design between the cutter 40 and cutter 10. These differences include the cutting tooth 45 having a smaller height and the surface 41 of cutting tooth 45 which is the only part of the cutter 40 formed at the largest radial distance R5. Other differences include angled surface 52, the provision of a second recessed surface 53, and the provision of spur 61 which reduces the contact between the ridge 50 and the wood. The flute 48 also assists in reducing the overall amount of contact or friction with the wood by guiding removed chips of wood into a space between the cutter 40 and the wood.

The reduction in contact between the cutter 40 and the wood reduces the amount of friction produced between the cutter 40 and the wood. The smaller amount of friction also reduces the required amount of torque that must be generated by the drill press. The smaller amount of contact between the cutter 40 and the wood also reduces the amount of heat generated by the cutter 40 during its operation. As discussed above, heat that is generated during the operation of any cutter is significant, since it may burn or otherwise damage the wood and can damage cutter 40. The problem of heat build-up is especially significant with hardwoods which generally are denser woods and which provide a greater amount of resistance to the rotation of the cutter 40. By reducing the amount of heat generated, the cutter 40 reduces the chance that operation of the cutter 40 will burn or otherwise cause damage to the wood.

Figure 6:
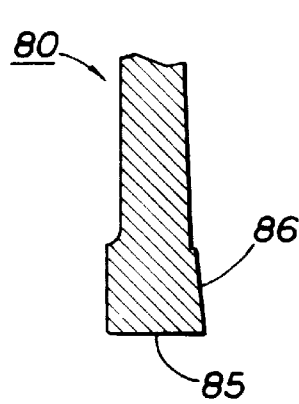
FIG. 6 is a sectional side view of a cutting tooth of a cutter according to a second embodiment of the invention.

A second embodiment of a cutter 80 is shown in FIG. 6 and differs from cutter 40 in that exterior surface 86 of a cutting tooth 85 is angled. Whereas the entire exterior surface 41 of the cutting tooth 45 in cutter 40 and exterior surface 11 of the cutting tooth 15 in cutter 10 are in contact with the wood, the cutting tooth 85 of cutter 80 is widest at its bottom and is consequently in intimate contact with the wood just near its bottom. The amount of contact, and thus friction, can therefore be even further reduced by forming the cutting tooth 85 with the angled exterior surface 86.

Figure 7:
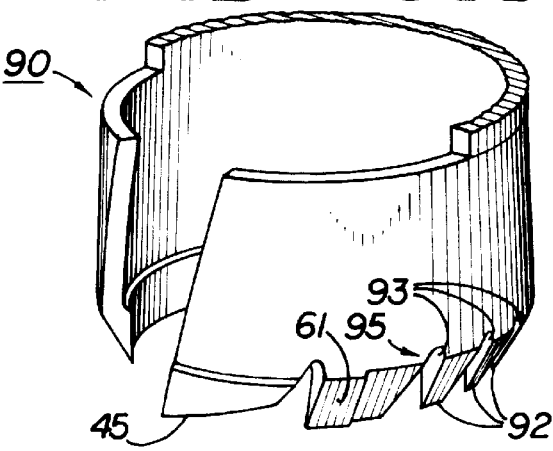
FIG. 7 is a partial perspective view of a cutter, according to a third embodiment of the invention, which has teeth formed along a beveled surface.

A third embodiment of a cutter 90 is shown in FIG. 7 and reduces contact with the wood in a trailing portion 95 of the cutter 90 that follows the spur 61. In the conventional cutter 10, a trailing portion 13 of the cutter 10 is that part of the cutter 10 which trails the cutting tooth 15 and includes the interior surface 25 and the beveled surface 19. With cutter 90, the trailing member 95 is that part of the cutter 90 which trails the spur 61. Cutter 90 differs from cutter 10 in that trailing member 95 of the cutter 90 includes a plurality of teeth 92 separated by flutes 93. The teeth 92 may continue around the entire length of the trailing portion 95 or, as shown in FIG. 7, may be located only immediately after spur 61.

The forgoing description of the preferred embodiments of the invention has been presented only for the purpose of illustration and description and is not intended to be exhaustive or to limit the invention to the precise forms disclosed. Many modifications and variations are possible in light of the above teaching.

For example, the cutting tooth 45 may be tapered along its width so as to reduce the amount of contact with the wood.

As discussed above with reference to FIG. 6, the cutting tooth 85 may be angled along its height whereby the exterior surface 86 of the cutting tooth 85 is in contact with the wood primarily only at the bottom of surface 86. Since only the cutting edge of the cutting tooth 45 or 85 needs to contact the wood, the exterior surfaces 41 and 86 of cutting tooth 45 and cutting tooth 85, respectively, may be modified so that radial distance of the cutting tooth 45 or 85 from the center C gradually decreases along the width of the cutting tooth 45 or 85 with the largest radial distance being located near the cutting tooth 46 and the smallest radial distance near the flute 48.

The cutters 40, 80, and 90 are preferably comprised of high carbon steel and are used to make dowels, plugs, or tenons from a piece of wood. The cutters 40, 80, and 90 provide an advantage in that dowels, plugs, or tenons may be fabricated without a lathe and may enter the wood either parallel to the grain of the wood or across the grain. The uses of the cutters 40, 80, and 90 are not limited to just dowels, plugs, or tenons but may be used in various other applications apparent to those skilled in the art. While the cutters 40, 80, and 90 have been described with reference to wood, it should be understood that the cutters 40, 80, and 90 may be used with other materials, such as certain plastics.

The spur 61 need not be located between the cutting tooth and the beveled surface but rather may be formed in other locations. For instance, the spur 61 may be positioned diametrically opposite the cutting tooth 45 or at some other location along the perimeter of the beveled surface 45. Moreover, the cutter is not limited to just one spur but may be formed with two or more spurs staggered along the perimeter of the body portion. The plural spurs may be advantageous over just a single spur since any forces generated by one spur which might cause the cutter to operate in an unstable manner may be offset by the forces associated with the other spur or spurs. Similarly, multiple cutting teeth could be used rather than the single cutting tooth shown in order to better balance forces associated with the cutting teeth and increase cutting speeds.

The embodiments were chosen and described in order to explain the principles of the invention and their practical application so as to enable others skilled in the art to utilize the invention and various embodiments and with various modifications as are suited to the particular use contemplated. It is intended that the scope of the invention only be limited by the claims appended hereto.

What is claimed is:

1. A cutter for forming a cylindrically-shaped member from a workpiece, comprising:
   a shank; and
   a body portion attached to one end of the shank and having a central bore for receiving the cylindrically-shaped member, the body portion including:
      a spur for forming a depression in the workpiece as the body portion rotates, the spur being positioned at a first radial distance from a center of the cutter and the depression defining a diameter of the cylindrically-shaped member;
      a cutting tooth for traveling within the depression and having a leading arris for cutting a trough into the workpiece as the body portion rotates, the cutting tooth being positioned at the first radial distance from the center of the cutter and having a thickness greater than that of the spur; and
      a first interior surface positioned at a bottom of the body portion for traveling within the trough cut by the cutting tooth, the first interior surface being spaced at the first radial distance from the center of the cutter;
   wherein the spur is lower on the body portion than the first interior surface so that a ridge formed at a lower most surface of the first interior surface is not in contact with the workpiece as the body portion rotates.

2. The cutter as set forth in claim 1, wherein the shank has a hex-shaped cross-section.

3. The cutter as set forth in claim 1, further comprising a second interior surface formed above the first interior surface and spaced farther away from the center of the cutter than the first interior surface.

4. The cutter as set forth in claim 1, further comprising a first exterior surface formed directly above the cutting tooth and the spur, the first exterior surface being located closer to the center of the cutter than a second exterior surface of the cutting tooth.

5. The cutter as set forth in claim 4, wherein the first exterior surface is angled so that a distance to the center of the cutter is less at a top of the first exterior surface than at a bottom of the first exterior surface.

6. The cutter as set forth in claim 4, further comprising a third exterior surface formed directly above the first exterior surface, the third exterior surface being located closer to the center of the cutter than the first exterior surface.

7. The cutter as set forth in claim 1, wherein the body portion has a flute which separates the cutting tooth from the spur and which terminates above the cutting tooth.

8. The cutter as set forth in claim 1, further comprising a trailing member for traveling within the trough, the trailing member including the first interior surface and extending from the first interior surface to a distance less than that of the spur.

9. The cutter as set forth in claim 1, wherein the trailing member has a plurality of flutes formed along its perimeter.

10. The cutter as set forth in claim 1, wherein an exterior surface of the cutting tooth is tapered with a bottom of the cutting tooth being wider than a top of the cutting tooth.

11. The cutter as set forth in claim 1, wherein the leading arris for cutting the trough in the workpiece is defined at the intersection of an exterior surface of the cutting tooth and a cutting edge and wherein the cutting edge is formed at an angle to a line extending from the center of the cutter to the leading arris.

12. A cutter for defining a cylindrically-shaped member from a workpiece, comprising:
   a shank; and
   a body portion attached to one end of the shank and having a central bore for receiving the cylindrically-shaped member, the body portion including:
      a cutting tooth having a cutting tooth for cutting a trough into the workpiece as the body portion rotates, the cutting tooth being positioned at a first radial distance from a center of the cutter and extending at most to a second radial distance;
      a trailing member positioned at a bottom of the body portion for traveling within the trough cut by the cutting tooth, the trailing member being positioned at the first radial distance from the center of the cutter and extending at most to a third radial distance which is less than the second radial distance; and
      a first exterior surface positioned directly above both the cutting tooth and the trailing member, the first exterior surface being formed at a fourth radial distance which is less than the second radial distance;

wherein the first radial distance from the center of the cutter defines a diameter of the cylindrically-shaped member and the trough in the workpiece extends from the first radial distance to the second radial distance from the center of the cutter.

13. The cutter as set forth in claim 12, wherein the shank has a hex-shaped cross section.

14. The cutter as set forth in claim 12, further comprising a spur, spaced at the first radial distance from the center of the cutter, for cutting a depression into the workpiece wherein the cutting tooth and the trailing member travel within the depression.

15. The cutter as set forth in claim 14, wherein the spur extends farther away from the center of the cutter than the trailing member but less than the second radial distance.

16. The cutter as set forth in claim 12, wherein the trailing member includes a plurality of flutes formed along its perimeter.

17. The cutter as set forth in claim 12, wherein an exterior surface of the cutting tooth is tapered along a height of the cutting tooth with a bottom of the cutting tooth extending to the second radial distance.

18. The cutter as set forth in claim 12, wherein the fourth radial distance is equal to the third radial distance and the first exterior surface is tapered with a bottom of the first exterior surface being formed at the fourth radial distance and a top of the first exterior surface being formed at a fifth radial distance which is smaller than the fourth radial distance.

19. The cutter as set forth in claim 12, further comprising a second exterior surface formed directly above the first exterior surface and formed at no more than a fifth radial distance from the center of the cutter, wherein the fifth radial distance is less than a fourth radial distance.

20. The cutter as set forth in claim 12, further comprising an interior surface positioned directly above the trailing member and being formed farther away from the center of the cutter than the trailing member.

21. A cutter for forming a cylindrically-shaped member from a workpiece, comprising:
 a shank; and
 a body portion, the body portion including:
  means for cutting an initial depression into the workpiece for defining a diameter of the cylindrically-shaped member;
  means for contacting the cylindrically-shaped member and for stabilizing rotation of the cutter; and
  means guided by the depression for cutting a trough into the workpiece;
 wherein the depression cutting means is lower on the cutter than either the trough cutting means or the contacting means and wherein the trough cutting means comprises a cutting tooth having a leading arris for cutting the trough in the workpiece.

22. The cutter as set forth in claim 21, wherein the means for cutting the initial depression comprises a spur.

23. A plug, dowel, and tenon cutter, comprising:
 a generally tubular body;
 a shank, attached to the body, for use in rotating the body;
 wherein said generally tubular body includes:
  a spur for forming a circular groove in a workpiece,
  a follower for traveling in the groove to stabilize rotation of the cutter, and
  a flute for traveling within the groove and for cutting a trough in the workpiece to define a cylindrically-shaped member of the workpiece;
 wherein the follower includes an interior surface for traveling within the groove and for contacting the cylindrically-shaped member and has a beveled exterior surface which is spaced from an outer edge of the trough in the workpiece.

24. A cutter for forming a cylindrically-shaped member from a workpiece, comprising:
 a shank; and
 a body portion, the body portion including:
  means for cutting an initial depression into the workpiece for defining a diameter of the cylindrically-shaped member;
  means for contacting the cylindrically-shaped member and for stabilizing rotation of the cutter; and
  means guided by the depression for cutting a trough into the workpiece;
 wherein the depression cutting means is lower on the cutter than either the trough cutting means or the contacting means;
 wherein the contacting means comprises a trailing member of the cutter which has a beveled exterior surface.

25. A plug, dowel, and tenon cutter, comprising:
 a generally tubular body;
 a shank, attached to the body, for use in rotating the body;
 wherein said generally tubular body includes:
  a spur for forming a circular groove in a workpiece,
  a follower for traveling in the groove to stabilize rotation of the cutter, and
  a cutting tooth for traveling within the groove and for cutting a trough in the workpiece to define a cylindrically-shaped member of the workpieces;
  wherein the spur is formed below the cutting tooth and below the follower.

26. The cutter as set forth in claim 25, wherein an exterior surface of the cutting tooth is formed at a greater distance from a center of the cutter than exterior surfaces of the spur and the follower.

27. The cutter as set forth in claim 25, wherein the shank has a hex-shaped cross-section.

28. The cutter as set forth in claim 25, wherein the generally tubular body has a central bore for receiving the cylindrically-shaped member.

29. The cutter as set forth in claim 25, wherein the cutting tooth has a leading arris for cutting the trough in the workpiece with the leading arris being defined at an intersection of an exterior surface of the cutting tooth and a cutting edge and wherein the cutting edge of the cutting tooth is formed at an angle to a line extending from a center of the cutter to the leading arris.

30. The cutter as set forth in claim 25, wherein a first exterior surface of the cutter formed directly above the spur and the follower is recessed relative to an outer surface of the cutting tooth.

31. The cutter as set forth in claim 30, wherein the first exterior surface is angled so that a distance to a center of the cutter is greater near a bottom of the first exterior surface than at a top of the exterior surface.

32. The cutter as set forth in claim 30, further comprising a second exterior surface formed above and recessed relative to the first exterior surface.

33. The cutter as set forth in claim 25, wherein the follower includes a plurality of flutes defining spaced teeth.

* * * * *